US006940539B1

(12) United States Patent
Tokman et al.

(10) Patent No.: US 6,940,539 B1
(45) Date of Patent: Sep. 6, 2005

(54) VARIABLE CABLE LENGTH COMPENSATOR FOR VIDEO IMAGING SYSTEMS

(75) Inventors: Alexander Y. Tokman, Waukesha, WI (US); Manfred D. Boehm, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/302,867

(22) Filed: Apr. 30, 1999

(51) Int. Cl.[7] .......................... H04N 5/335; H03F 3/191
(52) U.S. Cl. ........................ 348/162; 330/302; 379/398
(58) Field of Search ................................ 330/304, 302, 330/306; 333/28 R, 18; 348/710; 379/398; 375/230

(56) References Cited

U.S. PATENT DOCUMENTS 4,087,762 A * 5/1978 Ashley ....................... 330/304
4,151,490 A * 4/1979 Bazin ......................... 333/16
4,273,963 A * 6/1981 Seidel ........................ 379/398
4,996,497 A * 2/1991 Waehner ..................... 330/151
5,280,346 A 1/1994 Ross
5,708,703 A 1/1998 Nagaraj
5,841,810 A 11/1998 Phanse et al.

* cited by examiner

*Primary Examiner*—Chris Kelley
*Assistant Examiner*—Erick Rekstad
(74) *Attorney, Agent, or Firm*—Craig A. Fieschko, Esq.; DeWitt Ross & Stevens S.C.

(57) ABSTRACT

Described herein is a cable length compensator for inclusion in video imaging systems such as X-ray video imaging systems. When such systems are installed at sites of use, cables must generally be installed in the signal path, and the lengths of these cables—which can affect signal resolution—generally cannot be predicted prior to the time of installation. The cable compensator may be situated in the signal path along with the cable to compensate the signal for the effects of the cable so that the desired gain is provided across the desired range of signal frequencies. The compensator includes a low frequency compensation path and a high frequency compensation path, wherein the low frequency compensation path provides a simple gain adjustment to low frequency signals and the high frequency path provides gain adjustment dependent on both signal frequency and cable length. The high frequency gain adjustment is preferably provided by an array of high-pass filters which provide a substantially flat response across the range of input frequencies, and at least one variable resistance which may be adjusted for the desired high-frequency gain.

18 Claims, 3 Drawing Sheets

10
32
30
16
20
12
18
22
24
26
14
28

VARIABLE CABLE LENGTH COMPENSATOR FOR VIDEO IMAGING SYSTEMS

FIELD OF THE INVENTION

This disclosure concerns an invention relating generally to adjustment of signals in electronic imaging systems for better image quality, and more specifically to compensation of video signals in radiographic and fluoroscopic imaging systems to account for cables present in their video imaging chains.

BACKGROUND OF THE INVENTION

Image quality in radiographic and fluoroscopic (X-ray) imaging systems is determined by a set of physical parameters such as noise, contrast, spatial resolution, etc., and it is affected by the signal transfer functions of individual system components such as the X-ray tube, image detector, video processor, digital processor, etc. Moreover, the imaging performance of the system is not only affected by the performances of the individual components, but also by their interaction. The variability of the interaction can be greatly affected by calibration of these systems during manufacturing and at their installation sites. It was previously often found that radiographic/fluoroscopic systems (and more specifically their video imaging systems) suffered from degraded image quality once they were assembled at their installation sites, even though the components of these systems had undergone extensive factory calibration. This occurred even where components were calibrated both individually (to account for their individual transfer functions) and taken together (to account for their collective transfer functions). This image degradation at the installation site led to greatly increased costs because the systems would then need to undergo extensive field recalibration and/or replacement of system components that were suspected of being defective. There was therefore a substantial need for apparata and methods for allowing rapid recalibration so that image quality could be optimized.

SUMMARY OF THE INVENTION

It has been found that the video imaging subsystems of radiographic and fluoroscopic imaging systems are highly susceptible to the effects of the cables used to interconnect their various components. These cables vary in length depending on the particular installation site, and therefore the final installed cable length is not known at the time the video image chain is factory calibrated. If the cable length imparts conditions on the video chain which are different from those that were used to factory-calibrate the video subsystem, image quality at the installation site can be substantially degraded. As a result, the video imaging subsystem requires additional field calibration and/or replacement of components until image quality is raised to an acceptable level, and this greatly increases the time and cost burden of installation.

The cable compensator, which is defined by the claims set out at the end of this disclosure, is intended to be situated in a signal path of a video imaging system (such as the one in a radiographic/fluoroscopic imaging system) so that signal integrity is not degraded by the different cable lengths that might be present in the signal path at the installation site. The cable compensator may be situated in the signal path and set to an appropriate setting corresponding to the installed cable length, and will thereby equalize the video subsystem's frequency response with high precision from DC to a maximum frequency so that gain is unaffected across the range of video subsystem operating frequencies. An exemplary cable compensator in accordance with the invention includes a first path wherein a means for adjusting low frequency gain is situated between an input end and an output end, and a second path which includes an input end and an output end with several components situated therebetween: a means for adjusting high frequency gain, a variable resistance, and a parallel array of at least two capacitances. An output amplifier is also provided into which the output ends of the first and second paths are summed. The parallel array of capacitances, when taken in conjunction with the output amplifier and with one or more resistances provided in series with the capacitances, effectively allows the second path to act as an array of high-pass filters. As will be described at greater length later in this disclosure, when capacitance and resistance values are appropriately chosen and the low and high frequency gain adjustment means are properly tuned, the compensator can be situated in a signal path, the variable resistance of the second path can be set to a resistance value proportional to the length of the variable-length cable in the signal path, and the compensator will then provide a compensator output signal which is substantially similar to the cable input signal across the range of target signal frequencies. Most preferably, the variable resistance in the second path is provided in the form of a discretely variable resistance (e.g., a switched resistor divider array) and the low and high frequency gain adjustment means are provided by continuously variable resistances (e.g., rheostats). In addition, resistances are preferably provided in series with each of the capacitances in the parallel capacitor array (i.e., the array is formed of parallel RC series components), and this array is isolated from the other resistances in the second path by a buffer so that the other resistances do not contribute to the RC filtering characteristics.

The cable compensator is highly advantageous since it allows video signal paths, such as the video imaging chain of an X-ray imaging system, to be readily calibrated for any final cable length to be used at an installation site (this cable length being unknown at the time the system components and compensator are manufactured). Installation and field calibration time is greatly decreased, and image quality for a given X-ray system can be made consistent from one installation site to another. The compensator also avoids the situation where video subsystems are unnecessarily replaced because deficient image quality is seen as arising from a flaw in the video chain, but where it actually arises because the video chain is inappropriately calibrated for the cable length used at the installation site. Further advantages, features, and objects of the invention will be apparent from the following detailed description of the invention in conjunction with the associated drawings.

DETAILED DESCRIPTION OF PREFERRED EMBODIMENTS OF THE INVENTION

Figure 1:
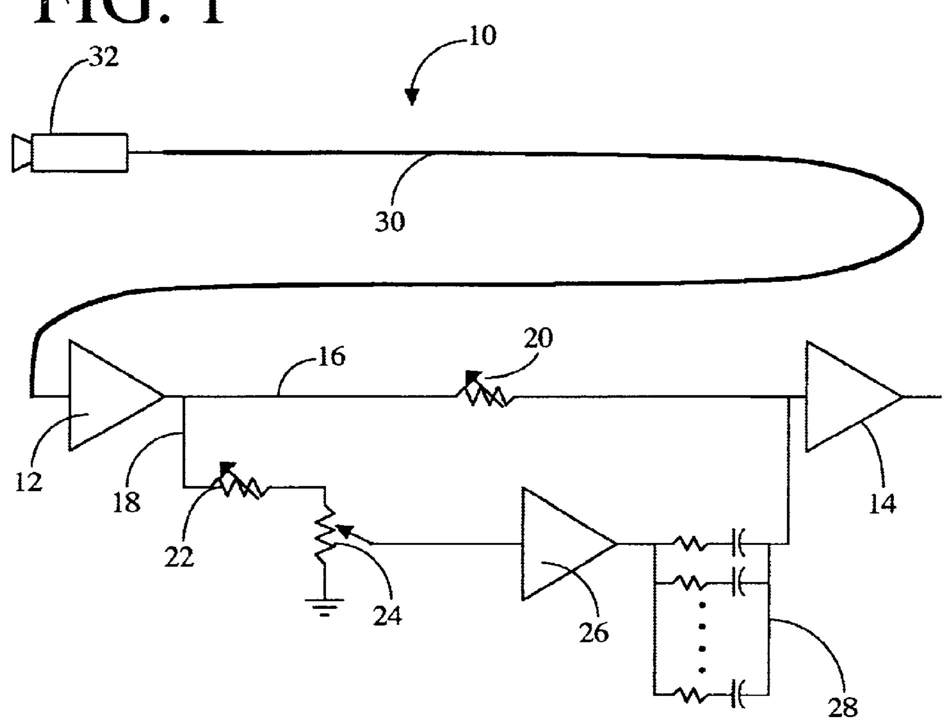
FIG. 1 is a schematic circuit diagram of an exemplary embodiment of the cable length compensator.

In the drawings, wherein the same or similar features of the invention are designated in all Figures with the same reference numerals, FIG. 1 illustrates an exemplary cable length compensator 10 in accordance with the invention. The cable length compensator 10 has two signal paths, a low frequency gain adjustment path ("first path") 16 and a cable length compensation path ("second path") 18. Each of these paths will now be discussed in turn.

The low frequency gain adjustment path 16 selectively sets the gain (ratio of output signal to input signal) of low frequency input signals as desired, and it includes an input amplifier 12, a means for adjusting low frequency gain 20, and an output amplifier 14 (wherein the input and output amplifier 12 and 14 are also shared by the cable length compensation path 18, i.e., the two paths 16 and 18 share the same input and output). The means for adjusting low frequency gain 20 is preferably a variable resistance which may be set to a desired value, and in the most preferred version of the invention, it takes the form of a rheostat.

The cable length compensation path 18 then includes the aforementioned input and output amplifiers 12 and 14, with several components interposed therebetween: a means for adjusting high frequency gain 22, a cable length selector 24, a buffer 26, and a compensation network 28.

The high frequency gain adjustment means 22 is used to set the overall gain of the cable length compensation path 18, and is preferably provided in the form of a variable resistance such as a rheostat.

Figure 2:
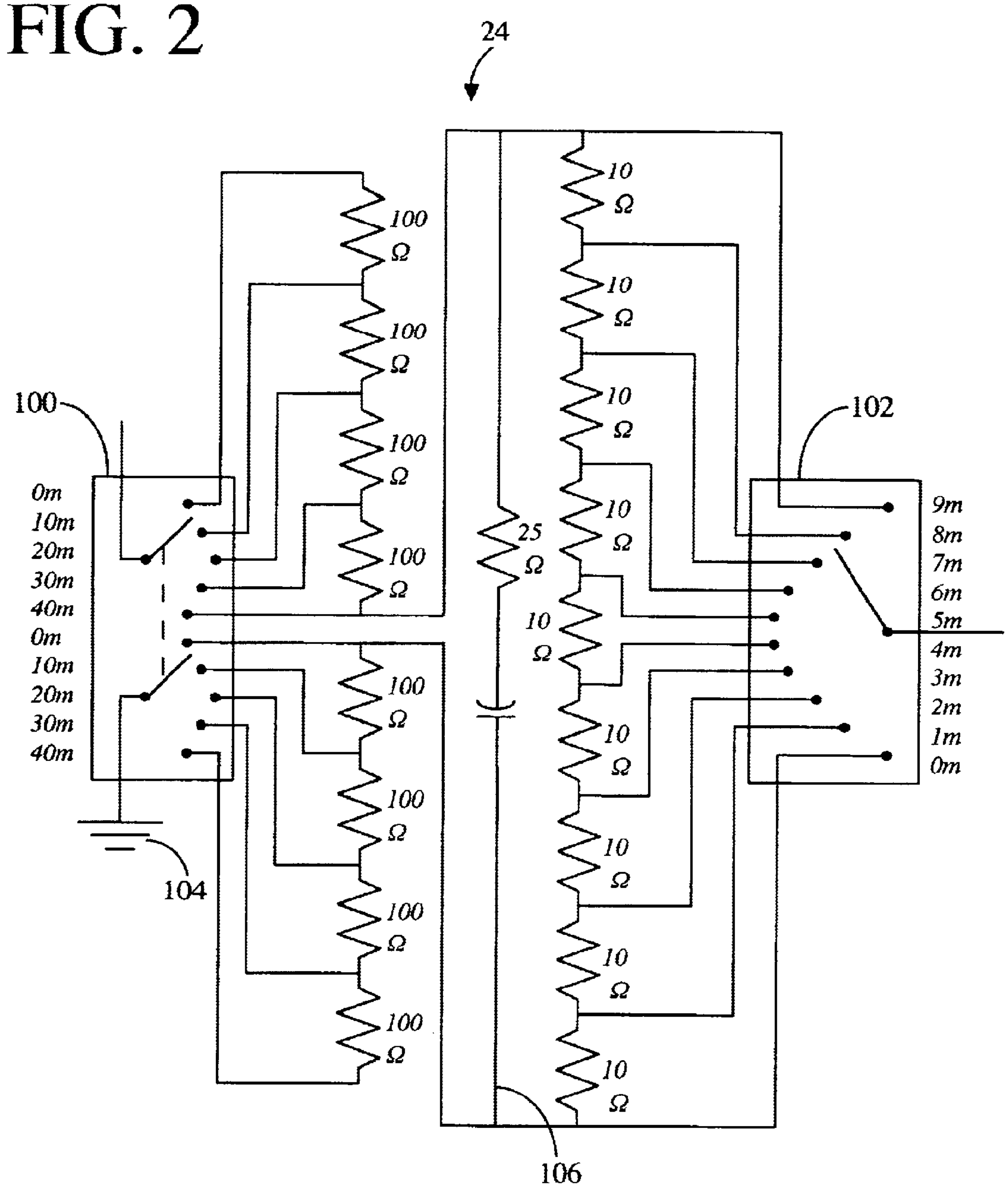
FIG. 2 is a circuit diagram of an exemplary cable length selector suitable for use in the cable length compensator of FIG. 1.

The cable length selector 24 is a variable resistance which provides an output which is proportional to the selected cable length (i.e., selection of a longer cable length provides greater output current and voltage). While the cable length selector 24 is illustrated in FIG. 1 as a simple potentiometer, it is preferably provided in the form of the switched resistor divider array shown in FIG. 2 (with exemplary resistor values illustrated). In FIG. 2, the array 24 includes a double pole five-position cable length switch 100 (i.e., a switch allowing resistor values corresponding to 0 m, 10 m, 20 m, etc.) and a single pole ten-position unit cable length switch 102 (i.e., a switch allowing resistor values corresponding to 0 m, 1 m, 2 m, etc.) so that the voltage across the array 24 may be varied linearly and discretely in proportion to cable lengths varying between 0–49 m (with the voltage to ground 104 remaining constant). An RC bridge 106 is preferably provided between the input and ground to serve as a filter for eliminating transient high-frequency switching pulses.

The buffer 26 is provided to isolate the high frequency gain adjustment means 22 and the cable length selector 24 from the compensation network 28. It is preferably provided by an amplifier (transistor) which provides a fixed amount of high-frequency gain.

The compensation network 28 includes a number of RC (resistor and capacitor) components arrayed in parallel, and having their outputs leading to the summing junction of the output amplifier 14 along with the output from the low frequency gain adjustment means 20 of the low frequency gain adjustment path 16. Thus, in conjunction with the output amplifier 14, the compensation network 28 effectively forms an array of high-pass filters, each of which provides frequency-dependent amplification. The quantity of RC components, as well as the "break" (lower cut-off) frequencies they provide, depends on the frequency range over which compensation is required, the degree of fine tuning needed, and the type of cable that will ultimately be used with the compensator 10. For best performance, the resistance and capacitance values of the compensation network 28 are preferably chosen in accordance with both deterministic principles of circuit analysis and also by empirical testing. An exemplary method of setting RC values during the design of the compensator 10 follows.

First, the low frequency gain adjustment path 16 is calibrated so that it will not interfere with the calibration of the compensation network 28 in the cable length compensation path 18. A test cable 30 of the same type to be ultimately used with the cable length compensator 10 at the installation site, and having a length corresponding to a medium length setting provided by the cable length selector 24 (e.g., 25 m), is connected to the input end of the input amplifier 12. The cable length selector 24 is then adjusted to a length setting corresponding to the test cable length. Video signals having varying low frequencies (e.g., 100 kHz to 1 MHz) and a known signal level are then swept through the test cable 30 and cable length compensator 10. The low frequency gain adjustment means 20 is then adjusted for unit gain, i.e., so that the output video signal equals the input video signal at low frequencies for the medium-length test cable. (Note that a medium-length test cable 30, being a good approximation of an "average" cable to be installed in the field, is used to approximate the low frequency voltage drop due to DC cable resistance in both long and short cables having potential use at the installation site.)

The settings for the RC values in the cable length compensation path 18 are then determined. A test cable 30 of the same type to be ultimately used with the cable length compensator 10 at the installation site, and having a length corresponding to the maximum length setting provided by the cable length selector 24, is connected to the input end of the input amplifier 12. The cable length selector 24 is then set to the maximum length setting, corresponding to maximum output current/voltage, and the high frequency gain adjustment means 22 is set to its medium setting. Signals having a known level are swept through the test cable 30 at varying high frequencies ranging up to the highest frequency to be accommodated by the video chain (e.g., over a range of 1–20 MHz). The resistor/capacitor values used in each RC path of the compensation network 28, which determine the breakpoints of these paths, are selected to provide unity gain and a flat response across the range of operating frequencies. Their values may be initially defined by circuit analysis, and can then be confirmed or adjusted by testing.

Once the RC settings have been determined in this manner, the specifications for the compensator 10 have been fully determined for any further compensators 10 to be produced for later use with cables of the same type as the test cable 30. The RC settings need not be changed unless the cable type to be used with the compensator 10 is changed (or unless the components or circuit/board layout of the compensator 10 is changed, in which case changes in parasitic capacitances may warrant recalculation of RC values). In other words, different compensators 10 with different compensation networks 28 are required for different types of cables, but the same compensator design may be used with different lengths of the cable type for which it was designed.

When further compensators 10 are produced in accordance with the determined specifications, it is desirable to "factory-calibrate" or fine-tune each compensator 10 to account for possible manufacturing and component variations. Fine-tuning of each individual compensator 10 is preferably done in much the same manner as the calibration of the low frequency gain adjustment path 16 and the cable length compensation path 18 during the design phase. A medium-length test cable 30 is provided at the input end of the input amplifier 12, the cable length selector, 24 is adjusted to a corresponding length, and the low frequency gain adjustment means 20 of the low frequency gain adjustment path 16 is adjusted to provide unity gain when the aforementioned low-frequency signal sweep is delivered through the compensator 10. The medium-length test cable 30 is then removed and replaced with a maximum-length test cable 30, the cable length selector 24 is adjusted to a corresponding length, and the high frequency gain adjustment means 22 of the cable length compensation path 18 is adjusted so that approximately unit gain is provided across the target frequency range when the aforementioned high-frequency signal sweep is delivered through the compensator 10.

Figure 3:
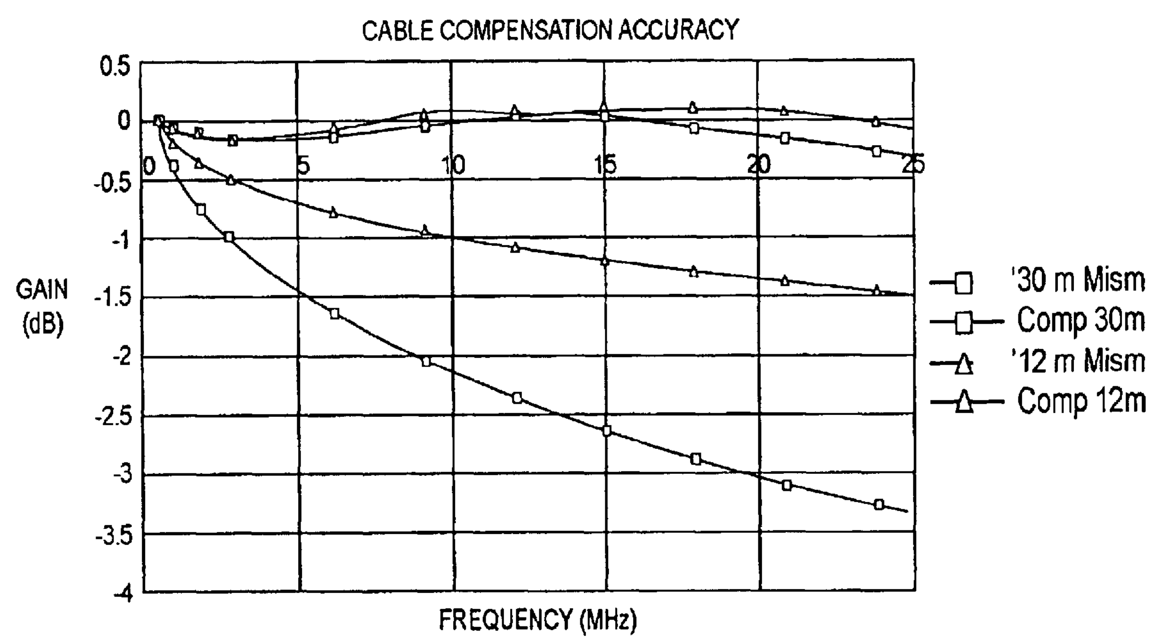
FIG. 3 is a plot of gain versus frequency in an exemplary X-ray video subsystem cable, shown for two different cable lengths and both with and without the inclusion of the cable length compensator.

Once these fine-tuning steps are completed for each individual compensator 10, they are ready for delivery and use at installation sites. Installation may be visualized with reference to FIG. 1 by now regarding the cable 30 as being the "site cable" (which is of the same type for which the compensator 10 was designed), and wherein a video imager 32 (e.g., a video camera) provides an input to the compensator 10. After installation, so long as the proper type of site cable 30 is provided at the input of the input amplifier 12 and the correct cable length is selected at the cable length selector 24, the cable length compensator 10 should provide a response (gain vs. frequency profile) which is at least substantially similar to that which would be provided if the cable 30 was not present. Therefore, the frequency profile of the signal coming out of the compensator 10 will be substantially the same as the frequency profile of the signal coming out of the video imager 32. If the input signal is very low frequency, the cable length compensator 10 acts like an open circuit. The input signal has virtually no cable loss at these frequencies, and the output of the low frequency gain adjustment path 16 is summed with the (negligible) output of the cable length compensation path 18. The result is a flat response out of the output amplifier 14 across the range of operating frequencies. As the input frequency increases, the capacitive reactance of the lowest frequency breakpoint in the compensation network 28 decreases, thus providing more current to the summing junction of the output amplifier 14. With proper calibration of the compensation network 28, the summing current will be exactly proportional to the loss incurring in the cable. As the frequency further increases, the successively higher breakpoints in the compensation network 28 provide current contributions to the summing junction. This compensation continues up to the highest frequency breakpoint. FIG. 3 provides a plot of frequency versus gain for two cables having lengths of 12 m and 30 m, both with and without the cable compensator 10 installed; it is seen that the cable compensator provides a substantially flat response, that is, it preserves the input signal's frequency profile and will thereby prevent the cables from having a significant effect on the transfer functions of the other components in the signal chain. In contrast, when the cable compensator 10 is not used, signal level dropoff is significantly greater at higher frequencies (particularly with longer cables).

Variations on the selection and arrangement of the aforementioned components are considered to be within the scope of the invention. Initially, while it was previously noted that the preferred low frequency gain adjustment means 20 is a rheostat, it should be understood that any other form of continuously-variable resistance could be used, as well as a discretely variable resistance (e.g., a switched array of resistors allowing selection of discrete resistance values). However, a continuously variable resistance is preferred. The low frequency gain adjustment means 20 preferably uses simple variable resistors such as rheostats, potentiometers, or resistor arrays for cost reasons, though more complex and expensive components (e.g., programmable gain stages) could also be used. Similarly, it is noted that the variable resistance of the high frequency gain adjustment means 22 may be provided in a wide variety of forms apart from a rheostat, e.g., those noted for the low frequency gain adjustment means 20 described above.

Likewise, apart from the potentiometer/resistor array previously described as being suitable for use as the cable length selector 24, the variable resistance of the cable length selector 24 could instead be provided in any of the forms that can be used for the low frequency gain adjustment means 20 and the high frequency gain adjustment means 22. However, it is emphasized that a variable resistance which allows a discrete and linear variation of potential in proportion to cable length is particularly preferred.

As another example of an alternative embodiment of the invention, it would be possible to replace the variable resistances of the high frequency gain adjustment means 22 and the cable length selector 24 with a single variable resistance, though this would make calibration and later cable changes significantly more difficult. It would also be possible to remove the buffer 26, in which case the resistance(s) interposed between the compensation network 28 and the output of the input amplifier 12 would contribute to the reactions of each path in the compensation network. Again, in this case calibration and subsequent cable selection is also made considerably more difficult.

Additionally, it is noted that the input amplifier 12, output amplifier 14, and buffer 26 may be provided by various forms of amplifiers, e.g., operational amplifiers or transistor-based amplifiers. Most preferably, they are provided in the forms noted above, i.e., operational amplifiers for the input amplifier 12 and output amplifier 14, and a transistor amplifier for the buffer 26.

Regarding the aforementioned factory calibration steps, it is noted that other methods of fine-tuning compensators 10 may be used. As an example, fine-tuning could instead occur at the installation site after the site cable 30 has been installed and the cable length selector 24 has been set to a corresponding length (i.e., the site cable 30 may be used to fine-tune both the low frequency gain adjustment path 16 and the cable length compensation path 18). In this case, the compensator 10 will still be adequately tuned to accommodate other site cables 30 of the same type by merely selecting the appropriate settings on the cable length selector 24. However, for the sake of efficiency, factory fine-tuning is preferred over fine-tuning at the site.

It is also noted that while the foregoing description discusses tuning of the low frequency gain adjustment path 16 and cable length compensation path 18 so that unit gain is provided across the range of target frequencies, they may instead be designed and tuned to provide a different level of amplification or attenuation.

The invention is not intended to be limited to the preferred embodiments described above, but rather is intended to be limited only by the claims set out below. Thus, the invention encompasses all alternate embodiments that fall literally or equivalently within the scope of these claims. It is understood that in the claims, means plus function clauses are intended to encompass the structures described above as performing their recited function, and also both structural equivalents and equivalent structures. As an example, though a nail and a screw may not be structural equivalents insofar as a nail employs a cylindrical surface to secure parts together whereas a screw employs a helical surface, in the context of fastening parts, a nail and a screw are equivalent structures.

What is claimed is:

1. An X-ray imaging system comprising:

a. a video imager, b. a cable including:

(1) a first end receiving a cable input signal from the video imager, and (2) a second end delivering a cable output signal, the cable output signal being different from the cable input signal;

c. a cable length compensator including:

(1) a first end receiving the cable output signal from the cable, (2) a first path leading from the first end, the first path including a variable resistance;

(4) a second path leading from the first end, the second path including:

(A) a first variable resistance, and (B) a parallel array of at least two capacitances;

(4) an output amplifier into which the outputs of the first and second paths are summed; and (5) a second end extending from the output amplifier and delivering a compensator output signal, the compensator output signal being substantially similar to the cable input signal.

2. The X-ray imaging system of claim 1 wherein the cable length compensator comprises a second variable resistance in the second path, wherein the first variable resistance is continuously variable and the second variable resistance is discretely variable.

3. The X-ray imaging system of claim 2 wherein the cable length compensator comprises a cable connected to the output amplifier, wherein the second variable resistance may be selectively set to discrete resistance values which are proportional to the variation of the resistance of the cable with cable length.

4. The X-ray imaging system of claim 2 wherein the cable length compensator additionally comprises at least two resistances, each resistance being situated in the parallel array in series with one capacitance.

5. The X-ray imaging system of claim 4 wherein the cable length compensator comprises a buffer separating the parallel array from the first and second variable resistances.

6. The X-ray imaging system of claim 1 wherein the cable length compensator additionally comprises at least two resistances, each resistance being situated in the parallel array in series with one capacitance.

7. The X-ray imaging system of claim 6 wherein the second path of the cable length compensator provides high-pass filtering in conjunction with the output amplifier.

8. The X-ray imaging system of claim 6 wherein the cable length compensator comprises a buffer interposed between the first variable resistance and the parallel array.

9. The X-ray imaging system of claim 6 wherein the cable length compensator comprises a second variable resistance in the second path, wherein the first variable resistance is continuously variable and the second variable resistance is discretely variable.

10. A cable length compensator comprising:

a. a first path including an input end, an output end, and a means for adjusting low frequency gain therebetween;

b. a second path including an input end and an output end, and having therebetween:

(1) a means for adjusting high frequency gain;

(2) a variable resistance; and (3) a parallel array of at least two capacitances;

c. an output amplifier into which the output ends of the first and second paths are summed.

11. The cable length compensator of claim 10 in combination with an X-ray imaging system including:

a. a video imager including a video output connection, b. a cable leading from the video output connection to the input ends of the first and second paths of the cable length compensator, wherein a signal delivered from the video imager at the video output connection is delivered in turn to the input ends of the cable length compensator and then to an output end of the output amplifier, and wherein the signal at the output end of the output amplifier has substantially the same frequency profile as the signal delivered from the video imager at the video output connection, but has a different frequency profile than the signal at the input ends of the cable length compensator.

12. The cable length compensator of claim 10 wherein the variable resistance is discretely variable.

13. The cable length compensator of claim 10 further comprising a cable connected to the output amplifier, wherein the variable resistance may be selectively set to resistance values which are proportional to the variation of the resistance of the cable with cable length.

14. The cable length compensator of claim 10 further comprising a buffer in the second path, wherein the parallel array is situated between the buffer and the output amplifier.

15. The cable length compensator of claim 10 further comprising at least two resistances, each resistance being situated in the parallel array in series with one capacitance.

16. The cable length compensator of claim 15 further coming a buffer in the second path, wherein the parallel array is situated between the buffer and the output amplifier.

17. A X-ray imaging system comprising:

a. a video imager;

b. a cable connected to the video imager and receiving a video signal therefrom;

c. a cable length compensator connected to the cable and receiving a cable signal therefrom, the cable length compensator including:

(1) a first path wherein the low frequency gain of the cable signal is adjusted, the first path including:

(A) an input end which receives the cable signal, and (B) a first path variable resistance; and (2) a second path wherein the high frequency gain of the cable signal is adjusted, the second path including:

(A) an input end which receives the cable signal;

(B) a second path variable resistance settable to resistance values proportional to the length of the cable, and (C) a high-pass filter;

(3) an output end wherein the adjusted cable signals are received from the first and second path and combined into a compensator output signal;

wherein the compensator output signal has substantially the same frequency profile as the video signal, and has a frequency profile different from the cable signal.

18. The X-ray imaging system of claim 17 wherein:

a. the cable length compensator further comprises an additional variable resistance in the second path, and b. one of the variable resistances in the second path is continuously variable, and one of the variable resistances in the second path is discretely variable.

* * * * *